United States Patent Office 2,978,496
Patented Apr. 4, 1961

2,978,496

TRIS-NITRAMINO ESTERS

Milton B. Frankel, Pasadena, and Karl Klager, Monrovia, Calif., assignors to Aerojet-General Corporation, Azusa, Calif., a corporation of Ohio No Drawing. Filed Aug. 22, 1955, Ser. No. 529,947

14 Claims. (Cl. 260—482)

This invention relates to new compositions of matter and a method for their preparation. In particular, this invention relates to tris-nitramino esters having the general formula:

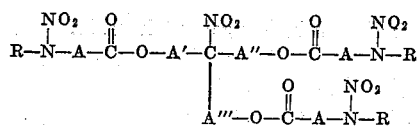

wherein R is an alkyl radical, and A, A', A" and A''' are lower alkylene radicals.

These compounds are excellent plasticizers for nitropolymers, such as the polyurethane propellants disclosed in assignee's copending application Serial No. 422,649, filed April 12, 1954, now abandoned, as well as nitrocellulose. The polyurethane propellants are solid, smokeless, self-sustaining rocket propellants. In use they are enclosed in a conventional rocket chamber having an opening or exit nozzle at one end. The propellant is ignited by means of a conventional igniter such as the electric squib-black powder variety whereby combustion of the propellant grain is initiated. The gases produced by this combustion are expelled through the exit nozzle thereby imparting propulsive force to the rocket motor. Commercial plasticizers used for such purposes at present are non-explosive and hence detract from the explosive or propellant power of the nitropolymers into which they are incorporated. The compounds of this invention, however, are not only plasticizers but also exhibit high explosive energy.

The nitropolymers can be polymerized in the presence of the nitramino ester or the nitramino ester can be mixed into the nitropolymer after polymerization. The plasticizer is incorporated into the nitropolymer in amounts preferably from about 10% to about 40% by weight of the composition.

The nitramino esters of this invention are prepared by reacting a nitramino acid halide with a nitroalkane triol in accordance with the general reaction scheme set forth below:

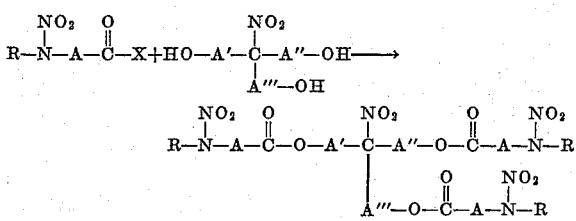

wherein R is an alkyl radical, X is a halogen radical and A, A', A" and A''' are lower alkylene radicals. Compounds having different acid radicals can be prepared by reacting a mixture of nitramino acid halides with a triol.

Increased smoothness of the reaction is obtained by conducting the reaction in the presence of a solvent such as chloroform or absolute ether. It is preferred to conduct the reaction at about reflux temperature in order to maintain a convenient rate of reaction. Other temperatures can be used; however, at lower temperatures the reaction is generally slow while at higher temperatures it is often difficult to control.

It is preferred as a matter of cost and convenience to use acid chlorides in the preparation of tris-esters, however, other halides can be used if desired.

The acid halides used as starting materials can be prepared by reacting a corresponding acid with a halogenation agent such as thionyl chloride. Nitroamino acids are prepared by hydrolysis of their corresponding nitriles, as disclosed in our copending application Serial No. 514,386, filed June 9, 1955, and by the condensation of nitroalkanols with amino acids, followed by nitration, as disclosed in assignee's copending application Serial No. 416,386, filed March 15, 1954, now abandoned.

To more clearly illustrate our invention, the following examples are presented. It is to be understood, however, that these examples are presented merely as a means of illustration and are not intended to limit the scope of the invention in any way.

EXAMPLE I

*Preparation of the tris-4-nitrazapentanoic acid ester of 2-hydroxymethyl-2-nitro-1,3-propanediol*

To a solution of 83 gm. (0.5 mole) 4-nitrazapentanoyl chloride in 100 ml. chloroform was added 20 gm. (0.13 mole) 2-hydroxymethyl-2-nitro-1,3-propanediol, and the mixture was heated at reflux temperature for six hours. The reaction solution was diluted with 100 ml. chloroform, washed with an equal volume of water, washed twice with 140 ml. portions 1% sodium hydroxide solution and given a final water wash. The solution was dried over sodium sulfate, and the solvent was then distilled in vacuo. On standing overnight, a few crystals formed in the viscous residue, and with stirring and scratching the entirety crystallized. The residue of crude product, weighing 90 gm. (theory, 69 gm.), was treated successively with portions of hot methanol. Approximately 30 gm. of material failed to dissolve and was discarded. The product was recovered from the methanol solutions on chilling. The ester melted at 77–78° C. and a second recrystallization raised the melting point to 81.5–82° C. The elemental analysis of the product was as follows:

Calculated for $C_{16}H_{27}O_{14}N_7$: percent C, 35.55; percent H, 4.99; percent N, 1814. Found: percent C, 35.74; percent H, 5.01; percent N, 18.72.

Other members of the disclosed class of tris-esters can be prepared by substituting different starting materials and proceeding in accordance with Example I, above. For example, the tris-3-nitrazaheptanoic acid ester of 2-hydroxymethyl-2-nitro-1,3-propanediol is prepared by reacting 2-hydroxymethyl-2-nitro-1,3-propanediol with 3-nitrazaheptanoyl halide; the tris-3-nitrazapentanoic acid ester of 2-hydroxymethyl-2-nitro-1,3-propanediol is prepared by reacting 2-hydroxymethyl-2-nitro-1,3-propanediol with 3-nitrazapentanoyl halide; and the tris-4-nitrazapentanoic acid ester of 2-hydroxymethyl-2-nitro-1,4-butanediol is prepared by reacting 2-hydroxymethyl-2-nitro-1,4-butanediol with 4-nitrazapentanoyl halide. Other homologues can be prepared by merely reacting appropriate alcohols and acid halides according to the disclosed method.

We claim:

1. As compositions of matter, tris-esters having the general formula:

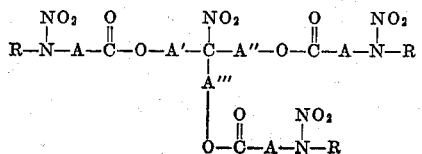

wherein R is lower alkyl and A, A', A" and A'" are lower alkylene radicals.

2. As compositions of matter, tris-esters having the general formula:

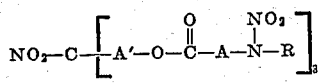

wherein R is lower alkyl and A and A' are lower alkylene radicals.

3. As a composition of matter, the tris-4-nitrazapentanoic acid ester of 2-hydroxymethyl-2-nitro-1,3-propanediol having the structural formula:

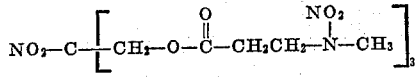

4. As a composition of matter, the tris-3-nitraza-heptanoic acid ester of 2-hydroxymethyl-2-nitro-1,3-propanediol having the structural formula:

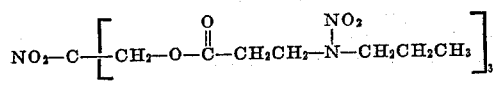

5. As a composition of matter, the tris-3-nitrazapentanoic acid ester of 2-hydroxymethyl-2-nitro-1,3-propanediol having the structural formula:

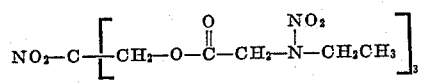

6. As a composition of matter, the tris-4-nitrazapentanoic acid ester of 2-hydroxymethyl-2-nitro-1,4-butanediol having the structural formula:

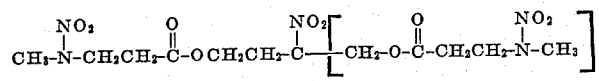

7. The method of preparing tris-acid esters having the general formula:

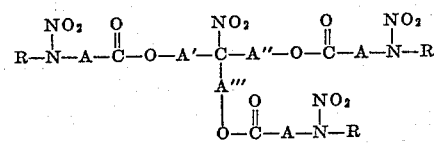

which comprises reacting an alcohol having the general formula:

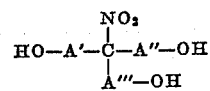

with an acid halide having the general formula:

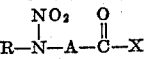

wherein R is lower alkyl, X is a halogen radical and A, A', A" and A'" are lower alkylene radicals.

8. The method of preparing tris-acid esters having the general formula:

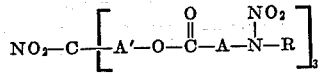

which comprises reacting an alcohol having the general formula:

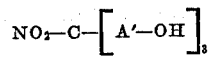

with acid halide having the general formula:

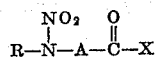

wherein R is lower alkyl, X is a halogen radical and A and A' are lower alkylene radicals.

9. The method of claim 7 wherein X is chloride.
10. The method of claim 8 wherein X is chloride.
11. The method of preparing the tris-4-nitrazapentanoic acid ester of 2-hydroxymethyl-2-nitro-1,3-propanediol which comprises reacting 4-nitrazapentanoyl chloride with 2-hydroxymethyl-2-nitro-1,3-propanediol.
12. The method of preparing the tris-3-nitrazaheptanoic acid ester of 2-hydroxymethyl-2-nitro-1,3-propanediol which comprises reacting 3-nitrazaheptanoyl halide with 2-hydroxymethyl-2-nitro-1,3-propanediol.
13. The method of preparing the tris-3-nitrazapentanoic acid ester of 2-hydroxymethyl-2-nitro-1,3-propanediol which comprises reacting 3-nitrazapentanoyl halide with 2-hydroxymethyl-2-nitro-1,3-propanediol.
14. The method of preparing the tris-4-nitrazapentanoic acid ester of 2-hydroxymethyl-2-nitro-1,4-butanediol which comprises reacting 4-nitrazapentanoyl chloride with 2-hydroxymethyl-2-nitro-1,4-butanediol.

References Cited in the file of this patent
UNITED STATES PATENTS
2,485,855    Blomquist et al. _____ Oct. 25, 1949